(12) United States Patent
McCaffrey

(10) Patent No.: US 7,637,709 B2
(45) Date of Patent: Dec. 29, 2009

(54) SAFETY INTERLOCK SYSTEM FOR MECHANICAL MANIPULATORS

(75) Inventor: Michael G. McCaffrey, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 558 days.

(21) Appl. No.: 11/484,264

(22) Filed: Jul. 11, 2006

(65) Prior Publication Data

US 2008/0014071 A1 Jan. 17, 2008

(51) Int. Cl.
*B66F 9/00* (2006.01)

(52) U.S. Cl. .................. 414/680; 403/325; 403/327

(58) Field of Classification Search ............. 414/652, 414/654, 674; 254/2 B; 403/325, 327, 328; 292/137, 166, 167, 173
See application file for complete search history.

(56) References Cited

U.S. PATENT DOCUMENTS

| | | | | |
|---|---|---|---|---|
| 461,350 A | * | 10/1891 | Lincoln | 70/129 |
| 1,057,303 A | * | 3/1913 | Trepa | 187/363 |
| 3,883,105 A | * | 5/1975 | Matsumoto | 248/281.11 |
| 4,044,900 A | * | 8/1977 | Gaumont et al. | 414/680 |
| 5,489,032 A | | 2/1996 | Mayhall, Jr. et al. | |

OTHER PUBLICATIONS

Print out of a website brochure from www.positech-solutions.com, entitled "Conco Balance Master Mount," publicly available prior to Jul. 11, 2006.

* cited by examiner

*Primary Examiner*—Donald Underwood
(74) *Attorney, Agent, or Firm*—Kinney & Lange, P.A.

(57) ABSTRACT

A safety interlock system including a rotatable lever operably connected to a lift component and to a load supporting component of a mechanical manipulator, where the rotatable lever is biased in a first rotational direction, and is configured to rotate in an opposite rotational direction in response to a lifting force applied by the lift component. The safety interlock system also includes a locking component configured to engage a support frame of the mechanical manipulator based on a rotational position of the rotatable lever.

20 Claims, 4 Drawing Sheets

SAFETY INTERLOCK SYSTEM FOR MECHANICAL MANIPULATORS

BACKGROUND OF THE INVENTION

The present invention relates to mechanical manipulators for supporting and transporting loads of materials and parts. In particular, the present invention relates to safety systems for use with mechanical manipulators.

Mechanical manipulators are used in a variety of industrial environments for lifting and transporting heavy loads of materials and parts. For example, a load of parts may be secured to a mechanical manipulator, so that the mechanical manipulator can lift the load to an elevated position. The mechanical manipulator may then be moved to transport the supported load to another location for use. Mechanical manipulators have undergone substantial developments in the fields of robotics, which allow such manipulators to be controlled in manual and automated manners. Such developments have increased the efficiencies and lifting capabilities of mechanical manipulators, thereby improving the automation in industrial manufacturing processes.

Due to increased lifting demands, a common issue with mechanical manipulators involve structural failures, where one or more components of a mechanical manipulator break under high stress. Such breakages can cause the supported loads to drop from the elevated positions to the floor below. This can damage or destroy the loads and the impacted floor. As such, there is a need for a safety mechanism that reduces the risk of dropping supported loads when a component of a mechanical manipulator breaks or otherwise fails.

BRIEF SUMMARY OF THE INVENTION

The present invention relates to a safety interlock system for use with a mechanical manipulator. The safety interlock system includes a rotatable lever operably connected to a lift component and to a load supporting component of the mechanical manipulator, and a locking component operably connected to the rotatable lever. The rotatable lever is biased in a first rotational direction, and is configured to rotate in an opposite rotational direction in response to a lifting force applied by the lift component. The locking component is configured to engage a support frame of the mechanical manipulator based on a rotational position of the rotatable lever.

DETAILED DESCRIPTION

Figure 1:
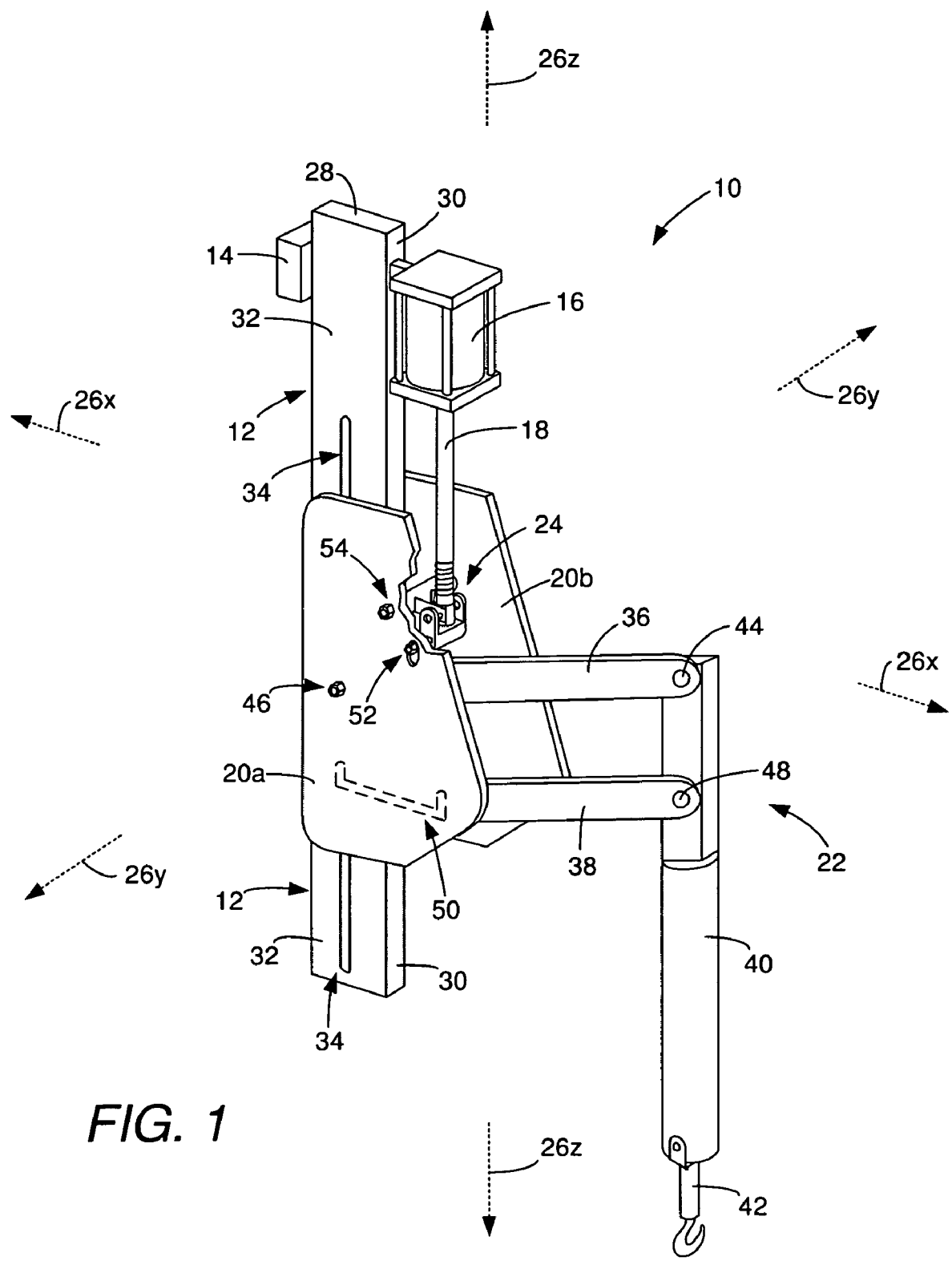
FIG. 1 is a perspective view of a mechanical manipulator that includes a safety interlock system.

FIG. 1 is a perspective view of manipulator 10, which is a ceiling-mounted mechanical manipulator for lifting and transporting heavy loads of materials and parts. Manipulator 10 includes support frame 12, control unit 14, pneumatic cylinder 16, pneumatic shaft 18, plates 20a and 20b, lift arm 22, and interlock system 24, where a portion of plate 20a and lift arm 22 are broken away to show interlock system 24. As discussed below, interlock system 24 is a safety system that prevents lift arm 22 from dropping if pneumatic shaft 18, or the connection between pneumatic cylinder 16 and pneumatic shaft 18, break or otherwise fail.

As shown in FIG. 1, manipulator 10 is oriented with respect to coordinate axes 26x, 26y, and 26z, where axes 26x and 26y define a horizontal plane, and where axis 26z is a vertical lift axis. As used herein, terms designating relative positions to a coordinate axis, such as "along axis 26x", refer to a direction that is generally collinear with, or parallel to, the coordinate axis.

Support frame 12 is a backbone shaft that extends along axis 26z, and which includes an upper end 28 that connects to a ceiling-mounted trolley (not shown) for moving manipulator 10. As such, manipulator 10 may be moved around a work area for lifting and transporting various materials and parts. Support frame 12 also includes front surface 30 and lateral surface 32, where front surface 30 is parallel to a plane defined by axes 26y and 26z, and lateral surface 32 is parallel to a plane defined by axes 26x and 26z. As shown, lateral surface 32 includes slot 34, which is a guide slot extending through support frame 12 along axis 26z that defines the range of vertical motion for lift arm 22.

Control unit 14 is secured to support frame 12, and contains a system for controlling manipulator 10 in a manual or automated manner. Pneumatic cylinder 16 is a lift component secured to front surface 30 of support frame 12, and in signal communication with control unit 14. Pneumatic cylinder 16 provides lifting force for raising and lowering lift arm 22, which allows supported loads to be lifted and lowered. In alternative embodiments, pneumatic cylinder 16 may be replaced with a variety of different lift components, such as hydraulic cylinders, electrical motors, and other similar actuators.

Pneumatic shaft 18 is a shaft interconnecting pneumatic cylinder 16 and interlock system 24, which is moved upward and downward by pneumatic cylinder 16. The upward and downward movement of pneumatic shaft 18 correspondingly directs the vertical movement of plates 20a and 20b, lift arm 22, and interlock system 24. Plates 20a and 20b are housing plates that extend on the lateral sides of support frame 12 and interlock system 24, and provide connection points for lift arm 22 and interlock system 24.

Lift arm 22 is a load supporting component that includes upper segment 36, lower segment 38, extension segment 40, and hook 42. Upper segment 36 is a first metal appendage that is pivotally connected to extension segment 40 via bolt 44. Upper segment 36 also connects to a support pin (not shown) that extends between plates 20a and 20b, along axis 26y, at location 46. This secures upper segment 36 to plates 20a and 20b. The support pin at location 46 also extends through slot 34 of support frame 12, thereby setting the range of vertical motion for lift arm 22.

Lower segment 38 is a second metal appendage that is pivotally connected to extension segment 40 via bolt 48. As shown in FIG. 1, plate 20a includes guide rail 50 (shown with hidden lines), which extends along axis 26x on the inner face of plate 20a. A second guide rail (not shown) also extends along axis 26x on the inner face of plate 20b. Guide rail 50 and the corresponding guide rail on plate 20b set the range of horizontal motion for lift arm 22 along axis 26x. Lower segment 38 is pivotally connected to a support pin (not shown) that extends within guide rail 50 and the corresponding guide rail on plate 20b, thereby allowing plates 20a and 20b to support lower segment 38.

Extension segment 40 extends along axis 26z, and is the portion of manipulator 10 from which the supported loads are suspended. Hook 42 is secured to the bottom tip of extension segment 40, and provides a convenient means for attaching the loads to extension segment 40. With the arrangement shown in FIG. 1, lift arm 22 is capable of being moved vertically along axis 26z and horizontally along axis 26x, simultaneously or independently. Motion along axis 26z is controlled by pneumatic cylinder 16. Motion along axis 26x is defined by the geometries of upper segment 36, lower segment 38, extension segment 40, and their interconnections with each other and plates 20a and 20b (e.g., guide rail 50). Motion along axis 26x is controlled by an operator and does not require mechanical actuation via pneumatic cylinder 16.

Interlock system 24 is a safety system disposed between plates 20a and 20b, adjacent front surface 30 of support frame 12. Interlock system 24 is pivotally connected to a pair of support pins (not shown in FIG. 1) that extend between plates 20a and 20b, along axis 26y, at locations 52 and 54. This secures interlock system 24 to plates 20a and 20b. Interlock system 24 is also pivotally connected to pneumatic shaft 18, which allows the lifting force applied to pneumatic shaft 18 to be translated through interlock system 24 to lift arm 22.

During a lift operation, pneumatic cylinder 16 applies a pulling force on pneumatic shaft 18, thereby raising pneumatic shaft 18 along axis 26z. This correspondingly pulls interlock system 24 upward along axis 26z. Because interlock system 24 is secured to plates 20a and 20b (via the support pins at locations 52 and 54), plates 20a and 20b are also raised along axis 26z. This correspondingly raises upper segment 36, lower segment 38, and extension segment 40, thereby lifting the supported load. When a desired height is reached, manipulator 10 may then be repositioned around the work area via the ceiling-mounted trolley.

Due to their relatively small sizes, pneumatic shaft 18, the connection between pneumatic cylinder 16 and pneumatic shaft 18, or the support pins connecting plates 20a and 20b and interconnect system 24 may break under the high stresses of a supported load. Standard loads supported by current mechanical manipulators typically reach weights of 1,500-2,000 pounds. Without the use of interlock system 24, a breakage of pneumatic shaft 18 would cause plates 20a and 20b, lift arm 22, and the supported load to fall under the weight of the supported load. The impact of such loads may damage or destroy the materials or parts.

As discussed below, interlock system 24 prevents lift arm 22 (and the supported load) from dropping if pneumatic shaft 18, or the connection between pneumatic cylinder 16 and pneumatic shaft 18, break. If such a break occurs, interlock system 24 engages with support frame 12, thereby preventing further movement of lift arm 22. This reduces the risk of damaging or destroying the supported load.

Figure 2:
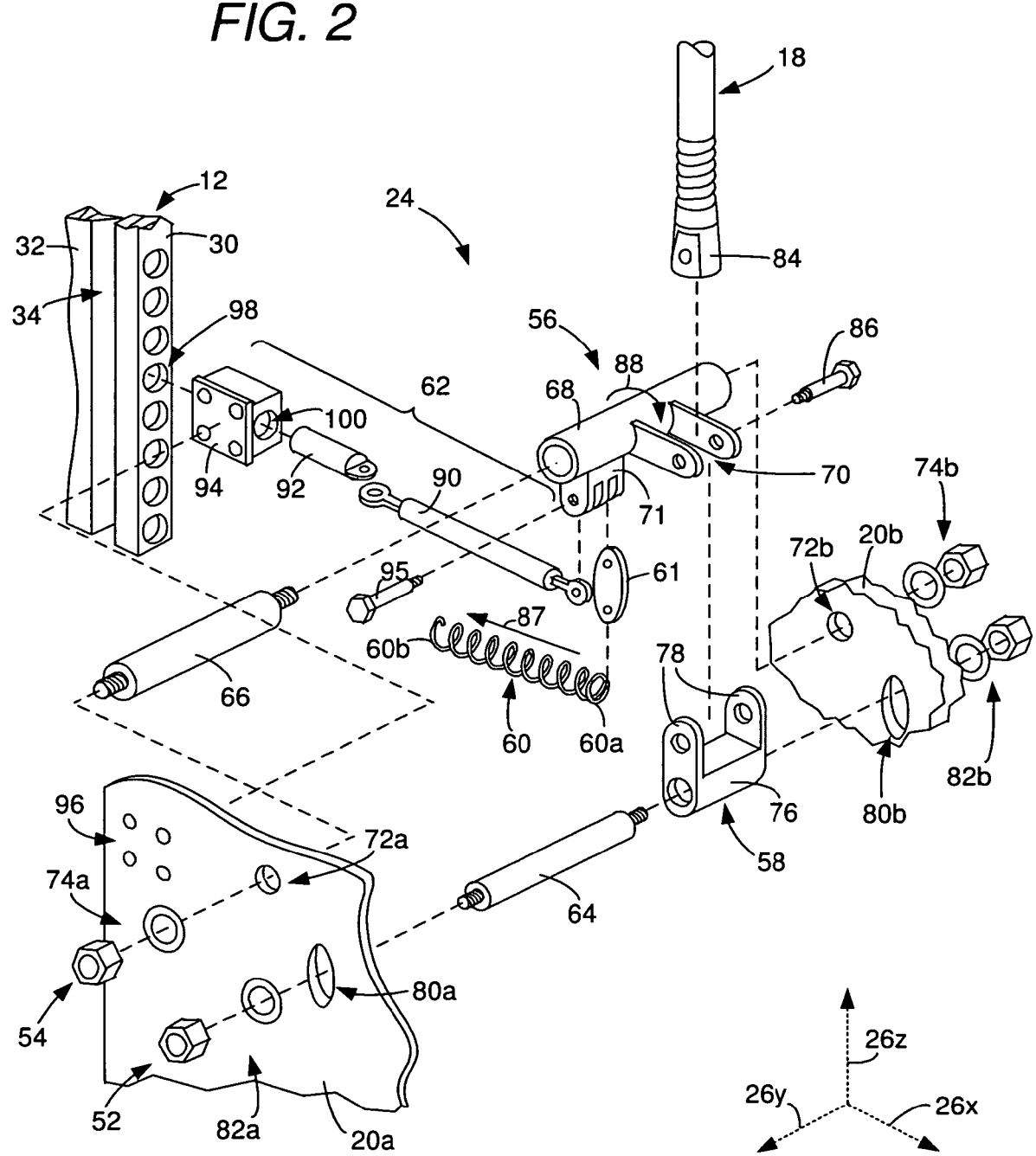
FIG. 2 is an exploded perspective view of the safety interlock system of the mechanical manipulator.

FIG. 2 is an exploded perspective view of interlock system 24 disposed between plates 20a and 20b, adjacent support frame 12. As shown, interlock system 24 includes bellcrank 56, yoke 58, spring 60, interconnect tab 61, locking assembly 62, primary support pin 64, and secondary support pin 66.

Bellcrank 56 is a rotatable lever that includes fulcrum tube 68, first arm portion 70 and second arm portion 71, where first arm portion 70 and second arm portion 71 extend from fulcrum tube 68 at about a right angle. In alternative embodiments, first arm portion 70 and second arm portion 71 extend from fulcrum shaft at non-right angles (e.g., from about 45 degrees apart to about 135 degrees apart). Bellcrank 56 is secured to plates 20a and 20b via secondary support pin 66 at location 54. Secondary support pin 66 extends through fulcrum tube 68, is secured to plate 20a at orifice 72a with nut/washer assembly 74a, and is secured to plate 20b at orifice 72b with nut/washer assembly 74b. This arrangement allows bellcrank 56 to rotate around secondary support pin 66.

Yoke 58 is a U-shaped component that includes base tube 76 and connection arms 78, where connection arms 78 extend upward along axis 26z from base tube 76. Yoke 58 is secured to plates 20a and 20b via primary support pin 64 at location 52, where primary support pin 64 extends through base tube 76 of yoke 58. Primary support pin 64 is secured to plate 20a at orifice 80a with nut/washer assembly 82a, and is secured to plate 20b at orifice 80b with nut/washer assembly 82b. As shown, orifices 80a and 80b are elongated along axis 26z to provide primary support pin 64 and yoke 58 with a range of movement along axis 26z.

Yoke 58 is also pivotally connected to bellcrank 56. First arm portion 70 of bellcrank 56 is positioned between connection arms 78 of yoke 58. Furthermore, pneumatic shaft 18 includes lower tip 84, which is positioned within first arm portion 70 of bellcrank 56. As such, pneumatic shaft 18, bellcrank 56, and yoke 58 are pivotally connected with bolt 86, which allows the upward pulling force applied to pneumatic shaft 18 to correspondingly pull bellcrank 56 and yoke 58 upward.

Spring 60 is a pre-biased, high-tension spring that includes first end 60a and second end 60b. First end 60a connects to second arm portion 71 of bellcrank 56 via interconnect tab 61. In an alternative embodiment, first end 60a is directly connected to second arm portion 71, and interconnect tab 61 is omitted. Second end 60b of spring 60 connects to an internally located support pin (not shown in FIG. 2) secured between plates 20a and 20b, which allows spring 60 to apply a bias force along axis 26x in the direction of arrow 87. The biasing force biases bellcrank 56 in a rotational direction of arrow 88 (clockwise direction in the view of FIG. 2). Alternatively, second end 60b of spring 60 may be secured to a variety of different locations on manipulator 10 to allow spring 60 to bias bellcrank 56 in the rotational direction of arrow 88. In another alternative embodiment, bellcrank 56 is self biased under tension in the rotational direction of arrow 88. In this embodiment, spring 60 and interconnect tab 61 are not required, and may be omitted.

Locking assembly 62 includes rod 90, locking pin 92, and alignment block 94. Rod 90 is an offset rod that extends along axis 26x, and is pivotally connected to second arm portion 71 of bellcrank 56 via bolt 95. Accordingly, bolt 95 pivotally connects bellcrank 56, interconnect tab 61, and rod 90. The opposing end of rod 90 connects to locking pin 92 via a bolt (not shown). Locking pin 92 is a locking component, and is the portion of interlock system 24 that engages with support frame 12 for preventing movement of lift arm 22.

Alignment block 94 is a block that is secured directly to plate 20a at orifices 96 via bolts (not shown), and is disposed adjacent front surface 30 of support frame 12. As shown in FIG. 2, a portion of front surface 30 includes an array of holes (referred to as array 98) extending along axis 26z. As discussed below, the holes of array 98 are holes in support frame 12 engageable by interlock system 24 to engage with to prevent lift arm 22 from falling. Alignment block 94 includes channel 100 that extends through alignment block 94 along axis 26x, and is aligned with the holes of array 98. Locking pin 92 is slidably disposed within channel 100 of alignment block 94, which allows locking pin 92 to engage with the holes of array 98.

As discussed below, locking assembly 62 engages with and disengages from the holes of array 98 based on the rotational position of bellcrank 56 around secondary support pin 66.

The rotational position of bellcrank 56 is correspondingly based on how much upward pulling force pneumatic shaft 18 applies to bellcrank 56.

Figure 3A:
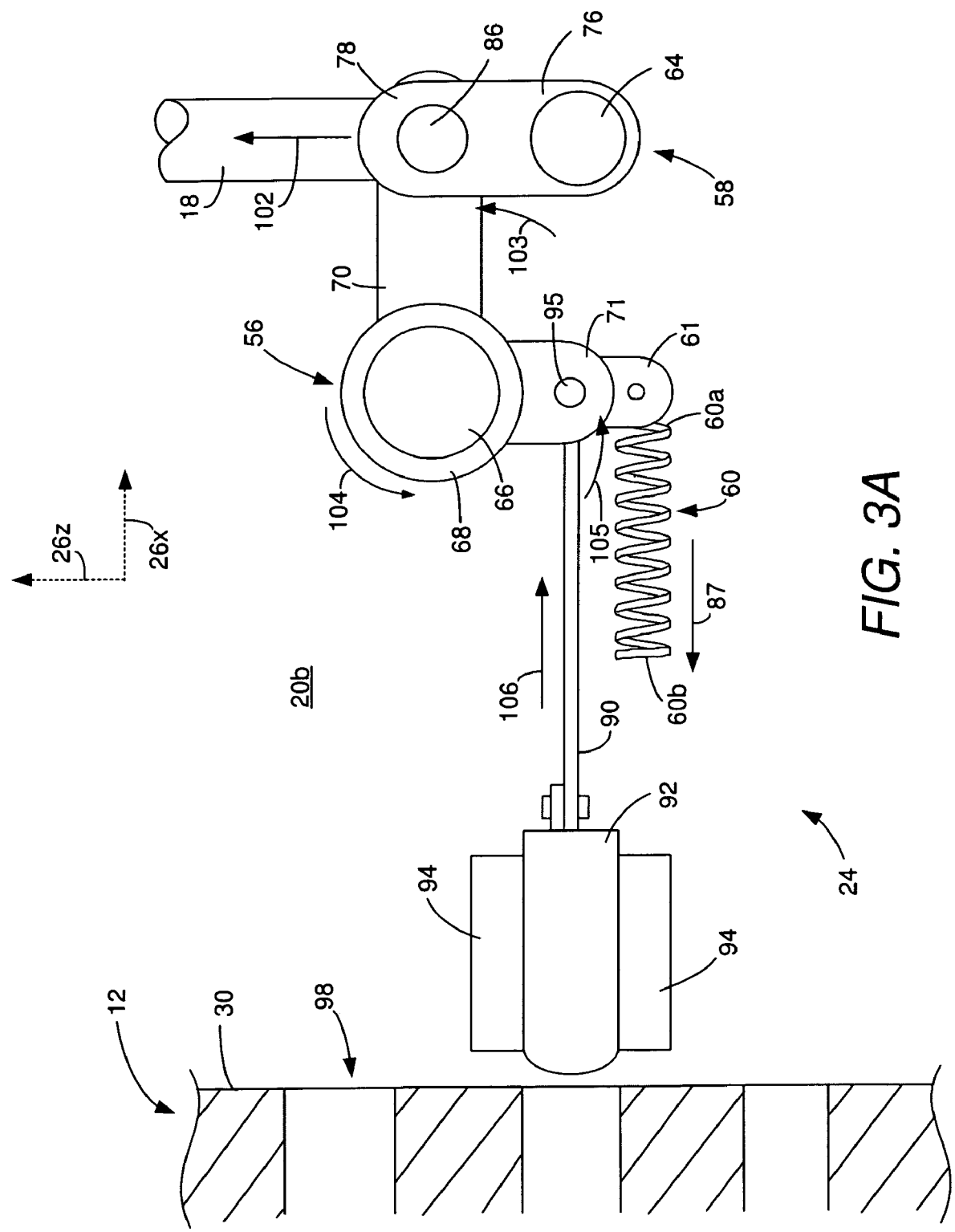
FIG. 3A is a side view of the safety interlock system in an unlocked state.
Figure 3B:
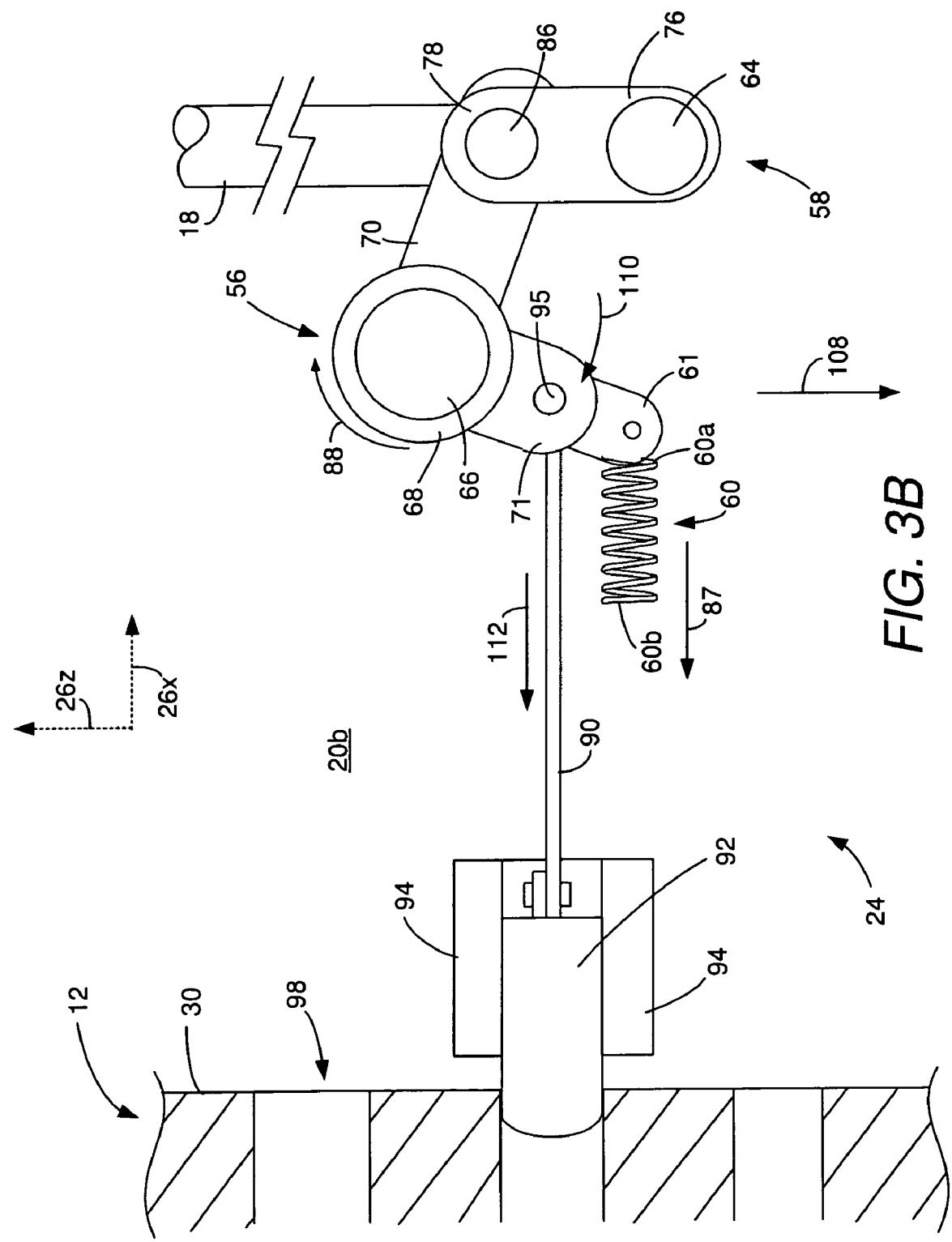
FIG. 3B is a side view of the safety interlock system in a locked state.

FIGS. 3A and 3B are side views of interlock system 24 in use with support frame 12 and pneumatic shaft 18, where support frame is shown in section. FIG. 3A shows interlock system 24 in an unlocked state (i.e., disengaged from support frame 12) during a lift operation. As discussed above, during a lift operation, pneumatic cylinder 16 (shown in FIG. 1) pulls pneumatic shaft 18 upward along axis 26z. This correspondingly applies an upward pulling force to bolt 86, which interconnects pneumatic shaft 18, first arm portion 70 of bellcrank 56, and connection arms 78 of yoke 58 (represented by arrow 102).

The upward pulling force on first arm portion 70 exceeds the opposing biasing force of spring 60 (in the direction of arrow 87), thereby causing first arm portion 70 to pivot upward in the direction of arrow 103. This rotates bellcrank 56 around secondary support pin 66 in a rotational direction of arrow 104 (counterclockwise direction in the view of FIG. 3A), which correspondingly pivots second arm portion 71 in the direction of arrow 105.

Bellcrank 56 rotates in the counterclockwise direction until it reaches the position shown in FIG. 3A. Bellcrank 56 has a rotational range that is governed by the range of movement of primary support pin 64, along axis 26z, within the elongated shapes of orifices 80a and 80b. As such, primary support pin 64 prevents bellcrank 56 from rotating further. The pivoting of second arm portion 71 in the direction of arrow 105 pulls rod 90 and locking pin 92 in the direction of arrow 106. This retracts locking pin 92 from one of the holes of array 98, thereby allowing pneumatic shaft 18 to lift plates 20a and 20b, lift arm 22, and interlock system 24 along axis 26z. Therefore, lift arm 22 may be raised to transport a supported load.

FIG. 3B shows interlock system 24 in a locked state (i.e., engaged with support frame 12) upon pneumatic shaft 18 breaking. Breakage of pneumatic shaft 18 eliminates the upward pulling force applied to plates 20a and 20b, lift arm 22, and interlock system 24. As such, the primary force applied to plates 20a and 20b, lift arm 22, and interlock system 24 is the weight of the supported load, which pulls plates 20a and 20b, lift arm 22, and interlock system 24 downward in the direction of arrow 108.

The breakage of pneumatic shaft 18 also eliminates the force that pivots first arm portion 70 of bellcrank 56 in the direction of arrow 103 (shown in FIG. 3A). Because first arm portion 70 of bellcrank 56 is no longer pivoted in the direction of arrow 103, the biasing force of spring 60 pivots second arm portion 71 in the direction of arrow 110. This rotates bellcrank 56 around secondary support pin 66 in the clockwise direction of arrow 88. The pivoting of second arm portion 71 pushes rod 90 and locking pin 92 in the direction of arrow 112 toward the holes of array 98. Interlock system 24 (and lift arm 22) drop along axis 26z until locking pin 92 aligns with the closest hole of array 98.

When locking pin 92 is aligned with a hole of array 98, the high-tension biasing force of spring 60 forces locking pin 92 to engage with the hole of array 98. This locks interlock system 24 to support frame 12, thereby preventing plates 20a and 20b, lift arm 22, and the supported load from dropping. The holes of array 98 are desirably placed close together along axis 26z to minimize the distance that lift arm 22 falls before locking pin 92 engages a hole of array 98. Furthermore, because of the heavy loads applied to the components of interlock system 24, the components are desirably formed from high-strength metals to prevent the components from breaking when interlock system 24 engages with support frame 12. Accordingly, interlock system 24 reduces the risk of damaging or destroying industrial loads that are lifted and transported with mechanical manipulators. Additionally, because interlock system 24 relies on mechanical interactions, expensive electronic monitoring equipment (e.g., sensitive accelerometers) are not required, thereby providing an inexpensive safety system.

Although the present invention has been described with reference to preferred embodiments, workers skilled in the art will recognize that changes may be made in form and detail without departing from the spirit and scope of the invention. For example, while manipulator 10 is shown above in FIG. 1 as a ceiling-mounted mechanical manipulator, interlock system 24 is also suitable for use with a variety of different mechanical manipulators (e.g., floor-mounted mechanical manipulators).

The invention claimed is:

1. A mechanical manipulator comprising:
    a support frame comprising:
        a front surface;
        a lateral surface perpendicular to the front surface;
        a vertical track that extends in a vertical direction; and
        a plurality of holes in the front surface;
    a lift component secured to the support frame for applying a lifting force in the vertical direction;
    a load supporting component operably connected to the vertical track for movement in the vertical direction;
    a rotatable lever operably connected to the lift component and to the load supporting component, the rotatable lever being biased in a first rotational direction, and being configured to rotate in a second rotational direction, opposite of the first rotational direction, in response to the lifting force applied by the lift component;
    a biasing component operably connected to the rotatable lever for applying a biasing force to bias the rotatable lever in the first rotational direction; and
    a locking component operably connected to the rotatable lever, and being configured to engage the holes of the support frame when the rotatable lever rotates in the first rotational direction in response to a downward force on the load supporting component that exceeds the lifting force.

2. The mechanical manipulator of claim 1, wherein the rotatable lever comprises a bellcrank having a fulcrum, and a first arm portion and a second arm portion extending from the fulcrum at an angle to each other.

3. The mechanical manipulator of claim 2, wherein the lift component is operably connected to the bellcrank at the first arm portion.

4. The mechanical manipulator of claim 1, further comprising:
    a shaft extending between the lift component and the rotatable lever, wherein the shaft applies the lifting force of the lift component to the rotatable lever.

5. The mechanical manipulator of claim 1, further comprising:
    an alignment block aligned with the plurality of holes of the support frame, wherein the locking component is slidably disposed within the alignment block.

6. A mechanical manipulator comprising:
    a support frame comprising:
        a front surface;
        a lateral surface perpendicular to the front surface;
        a slot through the lateral surface, the slot extending along a lift axis; and a plurality of holes in the front surface and extending along the lift axis;

a sliding assembly engaged with the slot and configured to move along the lift axis, the sliding assembly comprising:
   a housing plate adjacent the lateral surface of the support frame;
   a load supporting component connected to the housing plate;

a rotatable lever operably connected to the sliding assembly, the rotatable lever being biased in a first rotational direction toward a locking position that prevents movement of the load supporting component along the lift axis;

a biasing component for biasing the rotatable lever toward the locking position; and a lift component secured to the support frame and operably connected to the rotatable lever, the lift component being configured to rotate the rotatable lever in a second rotational direction opposite of the first rotational direction to allow lifting of the load supporting component along the lift axis.

7. The mechanical manipulator of claim 6, wherein the rotatable lever comprises a bellcrank having a fulcrum, and a first arm portion and a second arm portion extending from the fulcrum at an angle to each other.

8. The mechanical manipulator of claim 7, wherein the lift component is operably connected to the bellcrank at the first arm portion.

9. The mechanical manipulator of claim 6, further comprising a locking component operably connected to the rotatable lever, the locking component being configured to engage one of the plurality of holes in the support frame when the rotatable lever is in the locking position.

10. The mechanical manipulator of claim 6, further comprising:
   a shaft extending between the lift component and the rotatable lever, wherein the shaft applies the lifting force of the lift component to the rotatable lever.

11. The mechanical manipulator of claim 6, further comprising:
   an alignment block aligned with the plurality of holes of the support frame, wherein the locking component is slidably disposed within the alignment block.

12. The mechanical manipulator of claim 11, wherein the alignment block is connected to the housing plate.

13. The mechanical manipulator of claim 6, wherein the biasing component is a spring.

14. The mechanical manipulator of claim 1, wherein the biasing force is perpendicular to the lifting force.

15. The mechanical manipulator of claim 1, wherein the biasing component is a spring.

16. The mechanical manipulator of claim 15, wherein the spring has a first end operably connected to the second arm portion of the rotatable lever and a second end operably connected to the load supporting component.

17. The mechanical manipulator of claim 1, further comprising:
   a sliding housing in communication with the groove of the support frame and connected to the load supporting component, the sliding housing comprising:
      a first housing plate adjacent the lateral surface of the support frame; and
      a second housing plate connected to the first housing plate.

18. The mechanical manipulator of claim 17, the load supporting component further comprising:
   an upper segment connected to the sliding housing;
   a lower segment in communication with a guide rail on the first housing plate and a guide rail on the second housing plate; and
   an extension segment pivotally connected to the upper segment and the lower segment.

19. A mechanical manipulator comprising:
   a support frame comprising:
      a front surface;
      a lateral surface;
      a vertical track that extends along a vertical axis; and
      a plurality of holes in the front surface;
   a control unit secured to the support frame;
   a pneumatic cylinder secured to the support frame and in signal communication with the control unit, the pneumatic cylinder providing a lifting force along the lift axis;
   a pneumatic shaft connected to the pneumatic cylinder;
   a sliding housing in communication with the vertical track in the support frame, the sliding housing comprising:
      a first housing plate adjacent the lateral surface of the support frame; and
      a second housing plate connected to the first housing plate;
   a lift arm comprising:
      an upper segment connected to the sliding housing;
      a lower segment in communication with a guide rail on the first housing plate and a guide rail on the second housing plate; and
      an extension segment pivotally connected to the upper segment and the lower segment; and
   an interlock system connected to the pneumatic cylinder and disposed between the first housing plate and the second housing plate, the interlock system comprising:
      a rotatable lever having a first arm portion and a second arm portion;
      a spring having a first end operably connected to the second arm portion of the rotatable lever and a second end operably connected to a pin secured between the first housing plate and the second housing plate; and
      a locking assembly comprising:
         an alignment block secured to the first housing plate and disposed adjacent the front surface of the support frame; and
         a locking pin for engaging with the plurality of holes in the front surface of the support frame, the locking pin operably connected to the second arm portion of the rotatable lever and slideably disposed within the alignment block,
   wherein the rotatable lever is biased in a first rotational direction by the spring, and when the lifting force is applied by the pneumatic cylinder, the rotatable lever rotates in a second rotational direction, and when a downward force applied to the lift arm exceeds the lifting force, the rotatable lever rotates in the first rotational direction to engage the locking pin with the plurality of holes in the front surface of the support frame.

20. The mechanical manipulator of claim 19, wherein the interlock system further comprises:
   a yoke pivotally connected to the first arm portion of the rotatable lever and connected to a bottom end of the pneumatic shaft.

* * * * *